Aug. 13, 1935.  F. G. FOLBERTH ET AL  2,011,334

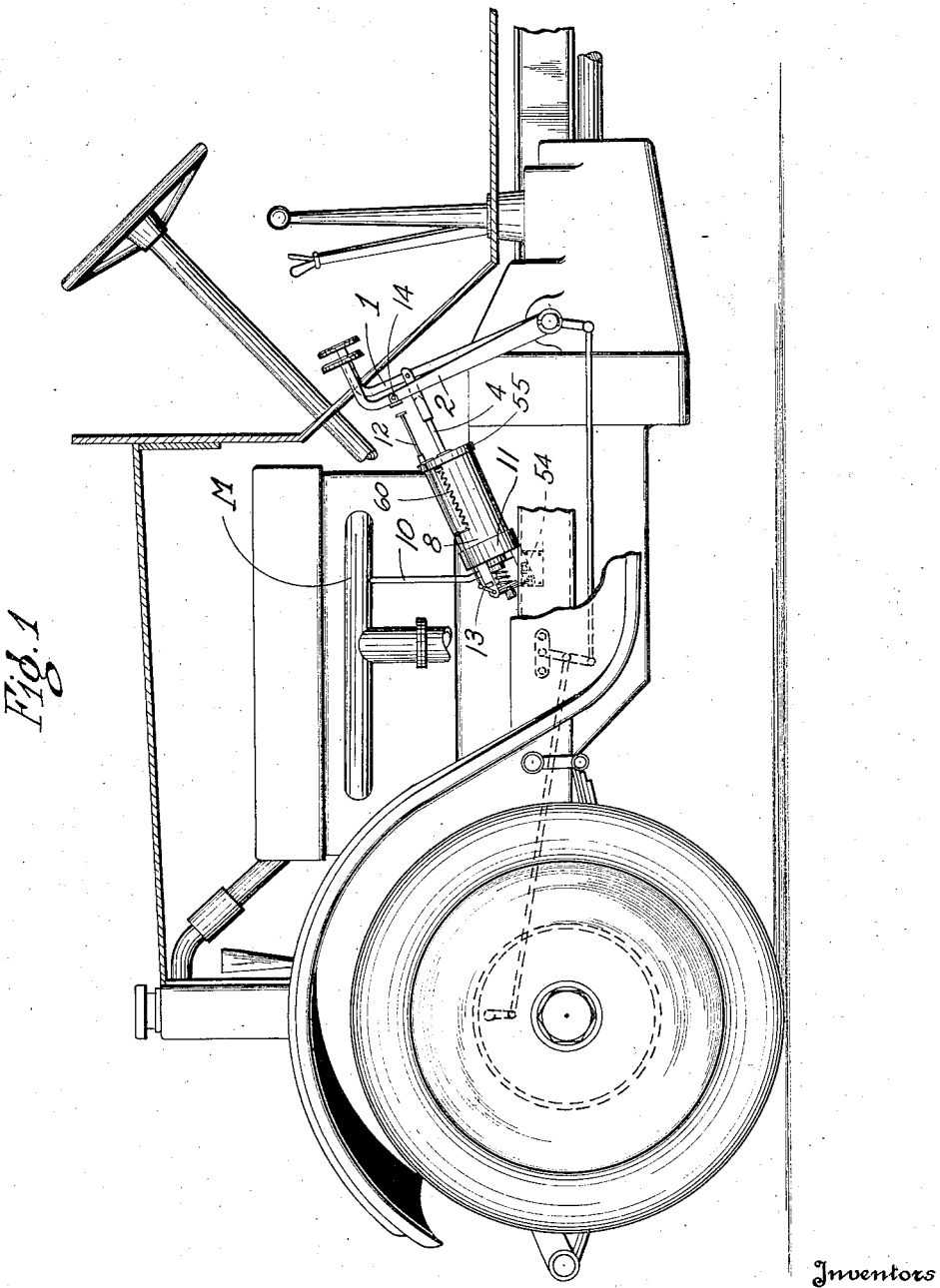

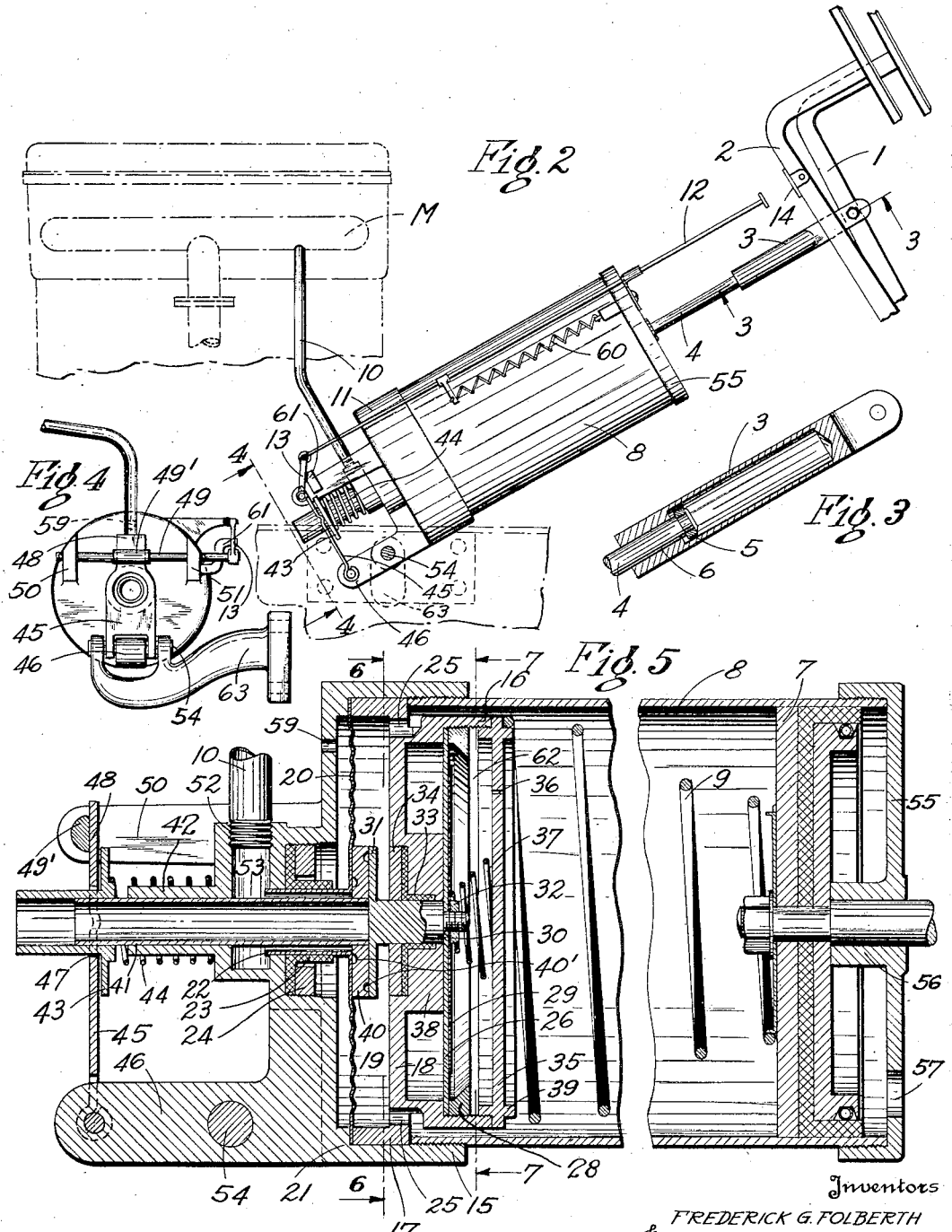

VEHICLE BRAKE

Filed Sept. 20, 1930   3 Sheets-Sheet 3

Inventors
FREDERICK G. FOLBERTH
& WILLIAM M. FOLBERTH

By Richey & Watts
Attorneys

Patented Aug. 13, 1935

2,011,334

UNITED STATES PATENT OFFICE 2,011,334

VEHICLE BRAKE

Frederick G. Folberth and William M. Folberth, Cleveland, Ohio

Application September 20, 1930, Serial No. 483,328

17 Claims. (Cl. 192—13)

This invention relates to brakes and more particularly to apparatus for actuating the brakes of automotive vehicles.

In our co-pending United States patent application, Serial No. 395,548, filed September 27, 1929, we have shown and described a fluid pressure actuated brake for vehicles adapted to be controlled by movement of the vehicle clutch pedal. The present invention relates to the same general type of control apparatus for motor vehicles.

In driving an automobile under present day traffic conditions it is absolutely essential that the driver have complete control over the car. Among the objects of our invention is to provide a braking system for automobiles which will reduce the effort and skill required to drive the automobile to a minimum.

Another object of our invention is the provision of a brake system for automobiles which greatly facilitates the control of an automobile, particularly in traffic and on hills.

Other objects are, the provision of a brake actuating device adapted to be controlled by the clutch pedal of the automobile; the provision of improved valve means for controlling the flow of fluid in fluid pressure brake systems and particularly in brakes of the type commonly known as vacuum brakes; the provision of a vacuum operated device for actuating the brakes of a vehicle in which the braking effect may be smoothly and positively applied with a minimum of effort on the part of the operator and which may be instantly released when desired; the provision in a vacuum actuated brake system of means for preventing too sudden application and consequent grabbing of the brakes; the provision of vacuum actuated means for operating the ordinarily foot pressure actuated brakes of an automobile, the vacuum means being so arranged that it does not interfere with the normal foot pressure pedal operation of the brakes; and the provision of a fluid pressure operating device for vehicle brakes which may quickly and easily be attached to standard types of motor vehicles.

The above and other objects of our invention will appear from the following description of one embodiment thereof, reference being had to the accompanying drawings in which;

Fig. 1 is a side elevation showing our control valve and actuating cylinder installed on an automobile;

Fig. 2 is an enlarged side elevation of our brake apparatus illustrated in Fig. 1;

Fig. 3 is a section taken on line 3—3 of Fig. 2.

Fig. 4 is an end view of of the valve and cylinder taken on line 4—4 of Fig. 2;

Fig. 5 is an enlarged sectional view of the improved valve and cylinder illustrated in Figs. 1 and 2;

Figure 6:
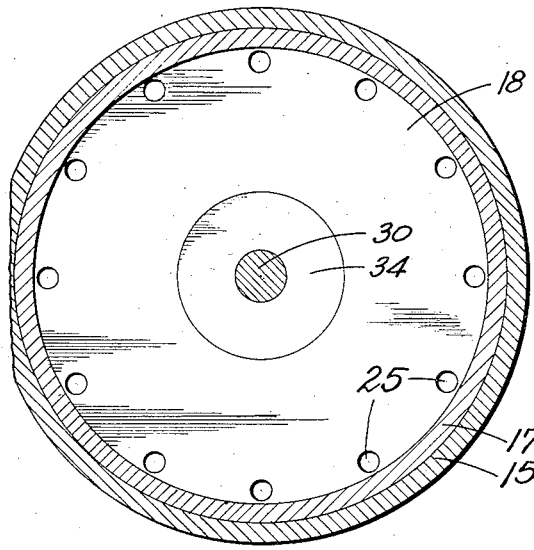
Fig. 6 is a section taken on line 6—6 of Fig. 5.
Figure 7:
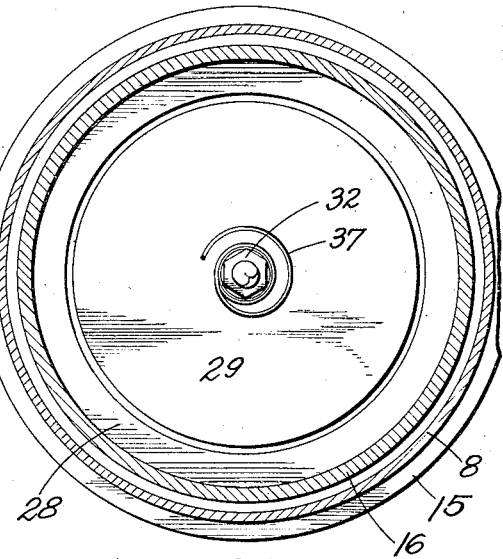
Fig. 7 is a section taken on line 7—7 of Fig. 5.

In the usual form of automobile control one pedal is provided for operating the brakes and another pedal for operating the clutch.

Referring to Fig. 1, the brake pedal 1 may be connected in any suitable manner to any desired form of braking system. The clutch pedal 2 in like manner may be connected to control the action of the clutch in well known manner. In operating an automobile equipped with our brake actuating mechanism, the brakes may be applied by the foot pedal 1 and the clutch may be disengaged by the pedal 2 in standard and well known manner without bringing into action our braking mechanism. However, when desired, the brakes can be applied by our vacuum actuated apparatus by merely pushing down on the clutch pedal further than is required for the normal operation of the clutch.

Pivoted to the brake pedal 1 is a lost motion connecting link 3 which in turn is connected to the piston rod 4 as best shown in Fig. 2.

The link 3 is hollow (Fig. 3) and the piston rod 4 carries a nut 5 which is adapted to move in the hollow portion of the link 3. The piston rod 4 has a sliding fit in the bearing portion 6 of the link 3 and it will be seen that this hollow link construction provides a connection between the brake pedal 1 and the piston rod 4 whereby the brake pedal may be pushed down without moving the piston rod 4. When the brake pedal is depressed the bearing portion 6 of the link 3 merely slides on the brake rod without appreciable friction or effect on the pedal operation. When the pedal 1 is in its normal brake released position the link 3 and the piston rod 4 occupy the relative positions illustrated in Fig. 2, and it will be seen that whenever the piston 7 moves to the left (Fig. 5) the brake pedal 1 will be depressed and the brakes will be applied in the same manner as though the foot pedal had been pushed down by the driver.

The piston 7 is adapted to move in the cylinder 8. A spring 9 is disposed within the cylinder 8 and tends to hold the piston 7 at the upper end thereof. The cylinder 8 is connected to the intake manifold M of the automobile engine by the pipe 10 which is connected to the control valve generally indicated at 11 in Figs. 1 and 2. This control valve 11 is adapted to control the flow of air from cylinder 8 into the intake manifold M.

The valve 11 is actuated only when the clutch pedal 2 is depressed more than is normally required for the disengagement of the clutch. This is accomplished by providing the push rod 12 which is connected to the lever 13 which effects the actual operation of the valve as will be more fully explained later. As best seen in Fig. 2, the rod 12 stops short of the normal disengaged position of the clutch pedal 2. A contact member 14 may be secured to the shank of the clutch pedal 2 and this member 14 is adapted to engage the end of the rod 12 when the clutch pedal 2 has been depressed to a position beyond that required to fully disengage the clutch. In Figs. 1 and 2 the clutch pedal 2 may be considered as being shown in the partially depressed position where the clutch is disengaged. This is substantially the position to which the pedal would be depressed in shifting gears. However, if it is desired to actuate our brake operating mechanism the clutch pedal is depressed further until the member 14 engages the end of the rod 12 and pushes it downwardly swinging the lever 13 about its pivot and opening the valve 11. When the valve 11 is open it permits the air to be drawn out of the cylinder 8 by the vacuum in the intake manifold M thus decreasing the pressure in the cylinder 8 and causing the piston 7 to move towards the lower or valve end of the cylinder. This movement of the piston 7 pulls the brake pedal 1 downwardly and operates the brakes of the vehicle in the same manner as though they had been applied by pressure of the operator's foot.

Referring particularly to Figs. 5, 6, 7 and 8 of the drawings, our improved valve for controlling the operation of the vehicle brakes, consists essentially of a cup-shaped cap member 15 which is internally threaded at its open end and screwed into position on the end of the cylinder 8. A secondary internal cup-shaped member 16 has a flange 17 which fits in the bore of the end cap 15. This cup member 16 is firmly held in position when the cap 15 is screwed into place on the end of the cylinder 8. The end wall 18 of the cup shaped member 16 forms a chamber 19 with the walls of the cap 15. A diaphragm 20, which is preferably of corrugated metallic construction, is disposed in the chamber 19 and firmly held at its periphery between the flange 17 and the shoulder 21 of the cap 15. A passage is provided into the chamber 19 through a cylindrical tubular extension 22 on the diaphragm 20 which projects outwardly from the center of the diaphragm and extends through a hole in the end of the cap 15. Suitable packing 23 of leather or like material is preferably provided to maintain a fluid tight joint around the outside of the tube 22. This packing is held in position by a ring 24 which may be screwed into position in the cap 15. The wall 18 of the secondary cup member 16 is formed with a number of holes 25 adjacent its outer edge which afford free communication between the chamber 19 and the inside of the cylinder 8.

A second diaphragm 26 is disposed within the cup shaped member 16. As illustrated, this diaphragm is made up of a flexible leather disc 27, which is held at its outer edge by the clamping ring 28, and a reinforcing plate 29. A plunger 30 having an enlarged disc-shaped head portion 31 is secured to the center of the diaphragm 26 by the nut 32. This plunger 30 extends out through the wall 18 and the enlarged disc head 31 is disposed in the chamber 19. The packing 33 assists in forming a fluid tight joint around the plunger 30 and may be held in position by the threaded ring 34.

The open end of the cup shaped member 16 is closed by a plate 35 which is threaded into the open end of the cup. This plate 35 is provided with a small vent hole 36 for purposes which will be fully described later. A spring 37 is disposed between the plate 35 and the diaphragm 26 and tends to always maintain the diaphragm against the central portion 38 of the wall 18.

Figure 8:
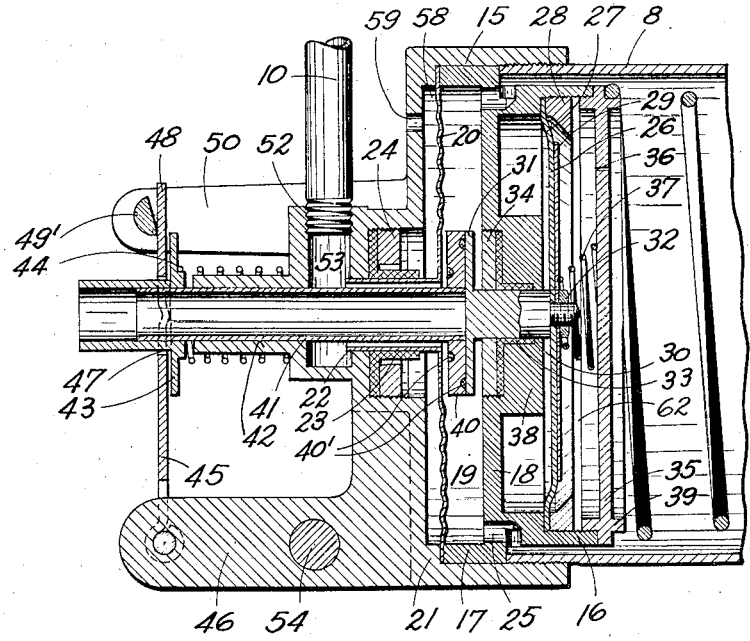
Fig. 8 is a sectional view similar to Fig. 5 but showing the valve in open position.

As is clearly seen in Figs. 5 and 8, the spring 9, which tends to force the piston 7 toward the upper end of the cylinder 8 may be seated on the plate 35 and be held in position by the annular flange 39.

The closure member 40 is secured to the end of a tube 41 which extends out through the cylinder 22 and through a bearing 42 which is formed integrally with the end cap 15. This bearing 42 supports the tube 41 and the closure member 40 and permits them to be moved in the operation of the valve. The outer end of the tube 41 is open to the atmosphere and the inner end lies within the chamber 19. A flange 43 is secured to the outer end of the tube 41 and acts as an abutment for the spring 44 which tends to hold the tube 41 in its farthest left position and to maintain the closure member 40 seated against the diaphragm 20 as best seen in Fig. 5. The closure member 40 may be provided with packing rings 40' to assist its seating against the diaphragm 20 and the disc 31.

The valve is operated by moving the tube 41 and the closure member 40 as will be more fully described later, and, to effect this movement we have provided a very simple and efficient operating mechanism. This mechanism consists of a plate 45 which is pivotally mounted at its lower end on the outwardly extending lug 46 of the end cap 15. This plate 45 is formed with a hole 47 which is adapted to fit over the end of the tube 41 and has an upwardly extending tongue portion 48 which is adapted to co-act with the flattened portion 49' of the shaft 49 to move the tube 41 and the closure member 40. The spring 44 maintains the flange 43 in contact with the plate 45 and the angular position of the shaft 49 determines the position of the plate 45.

When the flat portion 49' of the shaft 49 is parallel to the surface of the plate 45 (Fig. 5) the closure member is in its farthest left position and the valve is closed. When the shaft 49 is turned by movement of the lever 13 which is secured to one end thereof, the plate 45 will be moved about its pivot point and will exert pressure on the flange 43 thus compressing the spring 44 and moving the tube 41 and closure member 40 to the right. This movement of the closure member 40 opens the valve to the action of the suction in the intake manifold M and the parts assume the position shown in Fig. 8. It will be understood that the amount of movement imparted to the closure member 40 depends directly upon the degree of rotation given to the shaft 49.

As is best seen in Fig. 4 the shaft 49 is rotatably supported in the lugs 50 and 51 which protrude out from the end of the cap 15.

As noted above, the valve is connected to the intake manifold of the vehicle engine by a pipe 10. This pipe 10 enters the end cap 15 at 52 and a chamber 53 is formed in the cap 15 to provide free communication between the pipe 10 and the chamber 19. It will be noted that the tube 41 is of smaller outside diameter than the inside diameter of the tube 22 so that a free passage is provided between the two tubular members.

The entire valve and cylinder unit is preferably mounted on a suitable bracket 63 which is secured to the frame of the vehicle and the bolt or pin 54 acts as a pivotal support for the unit. This permits the cylinder 8 to swing about the pivot 54 when the piston rod 3 moves to actuate the vehicle brakes. This pivotal connection is necessary in the installation illustrated because of the angular relation of the brake pedal 1 and the piston rod 3.

The end of the cylinder 8 opposite from the valve end is closed by an end cap 55. This end cap 55 has a bearing portion 56 which is adapted to support and guide the piston rod 3 and is also provided with a vent hole 57 which allows atmospheric pressure to be exerted on the right hand end of the piston at all times.

Assuming that the engine of the motor vehicle is running, thus creating a partial vacuum in the intake manifold, the operation of our apparatus to effect the application of the vehicle brakes is as follows: When the operator depresses the clutch pedal 2 enough to engage the end of the rod 12, any further downward movement of the pedal 2 from this point on moves the rod 12 and swings the lever 13 about its pivot. If we assume that the parts of the valve mechanism and the piston and cylinder are in the position shown in Figs. 2 and 5, this movement of the lever 13 turns the shaft 49 and the flat portion 49' thereof, acts as a cam or eccentric and swings the plate 45 inwardly against the spring 44. As the plate 45 contacts with the flange 43, which is secured to the tube 41, this movement of the plate 45 moves the tube 41 into the valve housing. This movement of the tube 41 causes the closure member 40 to leave its seat on the central portion of the diaphragm 20 and, at the same time, push against the disc 31 causing the diaphragm 26 to move correspondingly.

The parts of the valve apparatus will now be in the position shown in Fig. 8, and it will be seen that the chamber 19 is connected to the suction of the intake manifold through the pipe 10. As the chamber 19 is connected with the cylinder 8 through the holes 25 in the wall 18, air will be withdrawn from the cylinder 8 and the piston 7 will move to the left. This movement of the piston 7 will pull downwardly on the brake pedal 1 and the brakes of the vehicle will be applied in the same manner as though applied manually by the operator.

The diaphragm 20 is spaced from the end of the cap 15 forming a chamber 58 on the opposite side of the diaphragm 20 from the chamber 19. This chamber 58 is connected to the atmosphere through a vent hole 59 in the end wall of the cap 15. If the closure member 20 is moved only a slight distance away from its seat on the central portion of the diaphragm 20, only a small amount of air will be withdrawn from the cylinder before the atmospheric pressure in the chamber 58 pushes the diaphragm 20 back to its seated position against the closure member 40, thus shutting off the intake manifold from the cylinder 8 and stopping the withdrawal of air therefrom. If the operator pushes the foot pedal further down, the closure member 40 is again moved away from its seat on the diaphragm 20 and a certain additional quantity of air is again withdrawn from the cylinder before the atmospheric pressure again pushes the diaphragm 20 into its seated position against the closure member 40. The total effective vacuum in the intake manifold may thus be applied in small degrees to the cylinder and piston rather than all at once, and it will be seen by those skilled in the art that we obtain a very smooth and gradual movement of the piston 7 and a correspondingly smooth and effective brake action.

For any definite position of the closure member 40, a certain degree of vacuum will be maintained within the cylinder 8, and thus a definite unvarying braking force will be applied to the piston 7 and its connections until the position of the closure member 40 is changed. When it is desired to release the brakes, the foot pedal 2 is allowed to return to its normal position and the spring 60 will pull the rod 12 back until the lever 13 strikes the stop 61. The spring 44 will then act to cause the closure member 40 to seat against the diaphragm 20 cutting off the intake manifold from the chamber 19. At the same time, the closure member 40 will move away from its seat on the disc 31 and the chamber 19 will be open to the atmosphere through the tube 41. During the brake application, the chamber 62 in the inner diaphragm supporting member 16 is under the same vacuum conditions as the inside of the cylinder 8 as the air within the chamber 62 will be withdrawn through the small vent hole 36. This hole 36 is preferably small enough so that an appreciable time will be consumed in bringing the chamber 62 to the same conditions of pressure as maintain in the cylinder 8. The result of this construction is that, when the closure member 40 is moved away from the disc 31, air under atmospheric pressure rushes in through the tube 41 and the chamber 19 to the cylinder 8, raising the pressure therein to that of the atmosphere, and allowing the spring 9 and the regular brake retracting springs to act upon the piston 7 to move it in the brake releasing direction. As the vent hole 36 is small, the flow of air therethrough from the cylinder 8 into the chamber 62 will be relatively slow and a partial vacuum will be maintained within the chamber 62 after the interior of the cylinder 8 reaches atmospheric pressure. The maintenance of this vacuum within the chamber 62 prevents the diaphragm 26 and the disc 31 from immediately following the movement of the closure member 40 and closing the connection between the cylinder 8 and the atmosphere before the cylinder has reached atmospheric pressure.

When the pressure in the cylinder 8 and the chamber 62 becomes equalized, that is, both reach atmospheric pressure, the diaphragm 26 and the disc 31 will return to their normal off position (Fig. 5) with the disc 31 seated against the closure member 40, thus completely closing off the cylinder 8 and the chamber 62 from external influences.

The spring 60, in addition to its function of returning the valve lever 13 to its closed position upon the clutch pedal moving in clutch engaging direction, serves to impose an extra resistance against the downward movement of the clutch pedal when the pedal strikes the end of the rod 12. This extra resistance to movement of the clutch pedal can be felt by the operator and indicates to him that the brake operating position of the pedal has been reached.

From the above description it will be seen by those skilled in the art that we have provided a vacuum actuated brake and a vacuum brake control valve which will give a very smooth and even braking action and which will permit the instant release of the brakes whenever the operator so desires.

By connecting our brakes up to be operated by the clutch pedal and still allow the normal operation of the brake by the operator's foot in standard manner, we provide a brake which is particularly suited to use in city traffic and of special value in assisting the drivers of automobiles, busses and trucks, in starting their machines after having stopped on a grade. When stopping on a grade it is ordinarily necessary to shift gears to a lower gear before starting up again, and to do this it is necessary to disengage the clutch. With the standard brake and clutch pedal system the operator must keep one foot on the clutch pedal and the other on the brake until he is ready to start up and then very quickly put his foot over on to the foot throttle to speed up the engine to give the necessary power to start on the hill. If he does not do this he must use the hand throttle or else use the hand operated emergency brake. This operation requires considerable skill and is particularly troublesome in the case of heavy busses and trucks. With my apparatus, by keeping one foot on the clutch pedal and depressing it until the vacuum operated device causes the brakes to be applied, the operator can hold the machine on the hill until he gets ready to start. The operator's other foot is free to manipulate the throttle and when he desires to start up the hill he needs only to remove his foot from the clutch pedal, thus releasing the brake and engaging the clutch at the same time, and with the other foot he is free to speed up the engine to any desired degree.

It will be understood however, that our brake is adapted to be used under other considerations and can be used to entirely replace the foot operation if desired. It will be further understood that where the term "manually" has been used in this specification and the accompanying claims it is intended to cover the operation of the vehicle control mechanisms either by the hand or foot of the operator.

Although we have described one embodiment of our invention in some detail, it will be understood by those skilled in the art that modifications and variations thereof may be made without departing from the spirit of our invention. We do not, therefore, limit ourselves to the precise details shown and described, but claim as our invention all embodiments thereof coming within the scope of the appended claims.

We claim:

1. A control system for automobiles including a pedal operated brake, a pedal operated clutch, and fluid pressure operated means controlled by said pedal operated clutch for moving said pedal operated brake whereby movement of said pedal operated clutch in clutch disengaging direction will cause application of the brake.

2. A control system for automobiles including a brake pedal, a clutch pedal and vacuum actuated means adapted to be controlled by movement of said clutch pedal in clutch disengaging direction for moving said brake pedal in brake applying direction.

3. A control system for automobiles including a brake pedal, a clutch pedal, a cylinder, a piston in said cylinder carrying a connecting rod, said connecting rod being connected to said brake pedal, a valve adapted to control the flow of fluid to and from said cylinder to cause movement of said piston, and valve operating means adapted to be actuated by disengaging movement of said clutch pedal to apply the vehicle brakes.

4. In a brake for automobiles having a clutch, the combination of a brake operating lever, a cylinder, a piston in said cylinder, a piston rod secured to said piston and extending out of said cylinder, lost motion means for connecting said piston rod to said brake lever whereby said brake lever may be moved from its normal position without moving said piston rod but whereby movement of said piston rod will cause movement of said brake lever, a valve for controlling the flow of fluid to and from said cylinder and means controlled by movement of the clutch for operating said valve.

5. In a brake for automobiles, the combination of a brake operating lever, a cylinder, a piston in said cylinder, a connecting rod secured to said piston and extending out of said cylinder, lost motion means for connecting said piston rod to said brake lever whereby said brake lever may be moved from its normal position without moving said piston rod but whereby movement of said piston rod will cause movement of said brake lever, a clutch operating lever, and means actuated by said clutch lever for controlling the flow of fluid to and from said cylinder.

6. A control system for vehicles including a brake, means for manually operating said brake, a clutch, means for manually operating said clutch, fluid pressure operated means for applying said brake and valve means controlled by said clutch operating means whereby the application and release of the brake may be controlled.

7. A control system for vehicles including a brake, means for manually operating said brake, a clutch, means for manually operating said clutch and fluid pressure operated means controlled by said clutch operating means for actuating said brake operating means to apply the vehicle brake.

8. In an automotive vehicle, the combination with clutch pedal controlled fluid pressure actuated means for applying the vehicle brakes of means for increasing the resistance to movement of said clutch pedal during its brake controlling movement.

9. An automotive vehicle having fluid pressure brake actuating means, a clutch operating lever adapted to operate the vehicle clutch during one part of its movement and to control said fluid pressure brake actuating means during another part of its movement, and means for increasing the resistance to movement of said lever during its movement to apply the vehicle brakes.

10. The combination with a clutch pedal of an automotive vehicle having a fluid pressure actuated brake mechanism, of a yieldable element adapted to be engaged by said clutch pedal upon partial depression of the clutch pedal, said element being positioned so that upon initial engagement of the same by the clutch pedal the clutch mechanism will have become disengaged, and valve means operable by further movement of the clutch pedal for controlling the fluid pressure actuated brake mechanism to apply the vehicle brakes.

11. The combination with an automotive vehicle having clutch and brake mechanisms and respective operating pedals therefor, of a yieldable resilient element adapted to be engaged upon partial depression of the clutch pedal sufficient to disengage the clutch mechanism and means operable upon further movement of the clutch pedal for actuating the brake mechanism.

12. Control apparatus for automotive vehicles including a brake, a brake operating lever, fluid pressure actuated means for applying said brake, connections between said fluid pressure actuated means and said brake operating lever, a valve for controlling the operation of said fluid pressure actuated means, a clutch, a clutch operating lever, and means for effecting movement of said valve to cause application of said brake, said last named means being disposed in position to be engaged by said clutch operating lever after the clutch operating lever has been moved to disengage said clutch.

13. Control apparatus for automotive vehicles including a fluid pressure actuated brake, a source of actuating fluid pressure, a valve for controlling the operation of said fluid pressure actuated brake, spring means for normally holding said valve in position to shut off the source of fluid pressure, a clutch operating lever, and means, adapted to be engaged by said clutch operating lever after said lever has been moved to disengage the vehicle clutch, for moving said valve to connect said source of fluid pressure to apply said fluid pressure actuated brake.

14. An automotive vehicle having fluid pressure brake actuating means, a clutch operating lever adapted to operate the vehicle clutch during one part of its movement and to control said fluid pressure brake actuating means during another part of its movement, and means effective only upon disengagement of the vehicle clutch for increasing the resistance to movement of said lever during its movement to apply the vehicle brakes.

15. In combination in an automotive vehicle having a brake and a clutch, a brake operating lever, a cylinder, a piston in said cylinder, a source of supply of actuating fluid pressure, fluid conducting connections between said source of supply and said cylinder, means for connecting said piston to said brake operating lever whereby said lever may be moved to apply the vehicle brake without causing movement of said piston but whereby movement of said piston will effect movement of said brake lever, valve means for controlling the flow of fluid to and from said cylinder and means, adapted to be actuated by movement of the vehicle clutch mechanism, for operating said valve.

16. In a brake mechanism for automotive vehicles, the combination of a brake operating lever, a cylinder, a piston in said cylinder, means for connecting said piston to said brake lever whereby said brake lever may be moved from its normal position without moving said piston but whereby movement of said piston will cause movement of said brake lever, a clutch operating lever and means actuated by said clutch lever for controlling the flow of fluid to and from said cylinder.

17. A control system for automotive vehicles including in combination, a clutch operating lever, fluid pressure actuated means for exerting a force tending to apply the vehicle brakes, a valve for controlling said fluid pressure actuated means and operating connections between said valve and said clutch operating lever whereby movement of said lever in clutch disengaging direction beyond fully disengaged position will operate said valve to cause said brake applying force to be exerted.

FREDERICK G. FOLBERTH.
WILLIAM M. FOLBERTH.